Oct. 6, 1931.                L. E. LA BRIE                1,825,671
                              BRAKE SHOE
                           Filed Nov. 25, 1927
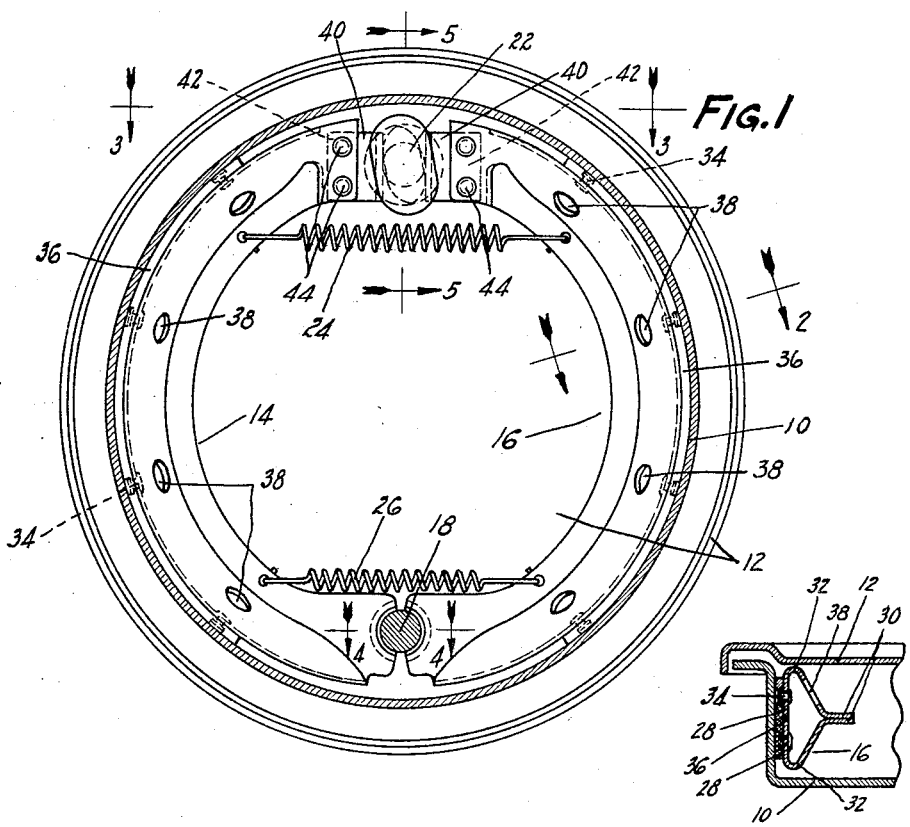
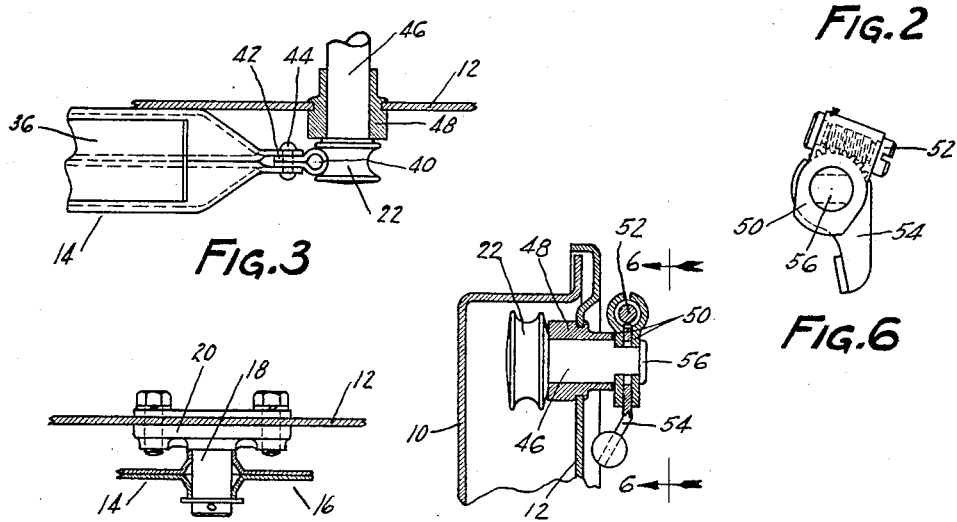
INVENTOR
LUDGER E. LA BRIE
BY
M. W. McConkey
ATTORNEY Patented Oct. 6, 1931

1,825,671

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed November 25, 1927. Serial No. 235,405.

This invention relates to brakes, and is illustrated as embodied in an internal expanding brake for an automobile. An object of the invention is to provide light but strong and inexpensive brake shoes, preferably built up in a novel manner from steel stampings.

An important feature of the invention relates to facilitating the insertion of rivets or other fastenings for the brake lining, in a shoe of triangular or other hollow section, by forming openings in the side walls of the shoe opposite the fastenings.

Other features of the invention relate to the provision of a novel thrust member at the end of the shoe, to the arrangement of the novel shoes, aand to various desirable and novel structural details which will be apparent from the following description of one illustrative embodiment shown in the accompanying drawings, in which:

Figure 1 is a vertical section through the brake, just inside the head of the brake drum, and showing the brake shoes in side elevation;

Figure 2 is a partial section on the line 2—2 of Figure 1, showing the structure of the shoe;

Figure 3 is a partial section on the line 3—3 of Figure 1, showing the end of one shoe in top plan;

Figure 4 is a section through the anchoring means of the brake, on the line 4—4 of Figure 1;

Figure 5 is a partial section through the applying means, on the line 5—5 of Figure 1; and Figure 6 is an elevation of part of the applying means, looking in the direction of the arrows 6—6 of Figure 5.

The illustrated brake includes a rotatable drum 10, at the open side of which is a support such as a backing plate 12, and within which are arranged a pair of novel interchangeable brake shoes 14 and 16 anchored on a pivot 18 formed on a bracket 20 secured to the backing plate 12. The shoes are applied by means such as a double cam 22, acting against the resistance of a return spring 24, while an auxiliary spring 26 may be provided to hold the shoes against the anchor 18.

Preferably each of the shoes is hollow, being illustrated as generally triangular in section (see Figure 2). I prefer to build up each shoe by welding or otherwise securing together, face to face, two steel stampings each of which forms one half of the shoe, and which have outer cylindrical flanges 28 welded together edge to edge to form the friction face of the shoe, the joint between the two flanges extending lengthwise down the friction face.

The stampings also have stiffening portions 30 spot-welded together to form a double-thickness stiffening web, and joined to the friction face by diverging portions 32 forming the side walls of the hollow shoe body. In order to facilitate the insertion of rivets or other fastenings 34 for the friction material or lining 36, according to an important feature of the invention, the side walls 32 are formed with openings 38 opposite the fastenings.

At the cam ends of the shoes, novel thrust members are provided for engagement with cam 22 or its equivalent. These members, in their illustrated form, comprise stampings doubled on themselves to form on each of them a cylindrical thrust portion 40 engaging the cam, and a double-thickness thrust portion 42 seated in a recess formed by spreading apart the ends of the two stampings making up the shoe, as shown in Figure 3, and secured in place by rivets or the like 44. Cam 22 is grooved to fit the cylindrical thrust portions 40.

Cam 22 is shown integral with a shaft 46 journaled in a support 48 secured to the backing plate 12, and flattened on its upper and lower sides on the side of the backing plate opposite the cam. Stampings 50 are apertured to fit over the flattened portion of the shaft, thus being keyed to the shaft, and are formed at their upper ends to embrace an adjusting worm 52 meshing with a sector of rack teeth in the upper edge of a stamped operating arm 54. The central opening in arm 54 is circular, so that turning worm 52 will adjust the arm 54 angularly on the shaft. The end of shaft 46 is riveted over at 56, to give a fixed tension acting on members 50, causing them frictionally to grip worm 52, to prevent its accidental displacement.

While one illustrative embodiment has been described in detail, it is not my intention to limit its scope to that particular embodiment, or otherwise than by the terms of the appended claims.

I claim:

1. A brake shoe having a recess at its end, in combination with a thrust member comprising a piece of sheet metal doubled on itself and forming a cylindrical thrust end and a double-thickness portion seated in said recess.

2. A brake shoe having a thrust member comprising a piece of sheet metal doubled on itself and forming a cylindrical thrust portion at the end of the shoe.

3. A brake shoe formed of a pair of stamped body members, and a stamped thrust member having a looped contacting portion and a double thickness attaching portion secured between the body members.

4. A brake shoe comprising a pair of stamped body members having a cylindrical friction surface, and a stamped thrust member having a cylindrical contact surface arranged with its axis substantially radial of the friction surface.

In testimony whereof, I have hereunto signed my name.

LUDGER E. LA BRIE.